United States Patent
Wang

(10) Patent No.: US 6,557,462 B1
(45) Date of Patent: May 6, 2003

(54) COMBINED VACUUM VALVE AND VACUUM INDICATOR

(76) Inventor: Soo chang Wang, Samick apartment 503-1003, 15, Myungil-1dong, Kangdong-ku, Seoul (KR), 134-824

( * ) Notice: Subject to any disclaimer, the term of this patent is extended or adjusted under 35 U.S.C. 154(b) by 0 days.

(21) Appl. No.: 10/272,656

(22) Filed: Oct. 17, 2002

(30) Foreign Application Priority Data

Dec. 28, 2001 (KR) ..................................... 2001-40766 U
Feb. 18, 2002 (KR) ..................................... 2002-4815 U

(51) Int. Cl.⁷ ........................... A47J 27/00; A47J 36/00; A45C 11/20
(52) U.S. Cl. .............................. 99/472; 99/454; 99/451; 99/DIG. 14; 219/732; 219/735; 219/759; 34/263; 34/391; 34/417; 220/212; 220/231; 220/214
(58) Field of Search ........................... 99/352–355, 454, 99/340, 470, 472, 451, DIG. 14; 126/369, 375; 219/730, 732, 734, 735, 759; 220/212, 231, 240, 592, 918, 27, 271, 62.15, 319, 791, 795, 260, 270; 206/524.8, 550; 34/263, 391, 417; 141/65, 95, 192; 426/107, 234, 462

(56) References Cited

U.S. PATENT DOCUMENTS

| | | | | |
|---|---|---|---|---|
| 3,771,688 A | * | 11/1973 | Frankenberg et al. | 220/271 |
| 4,051,971 A | | 10/1977 | Saleri et al. | |
| 4,111,330 A | * | 9/1978 | Jordon | 220/319 |
| 4,498,378 A | * | 2/1985 | Norrie et al. | 99/472 |
| 4,785,955 A | * | 11/1988 | Sasaki | 220/62.15 |
| 5,398,811 A | * | 3/1995 | Latella, Jr. | 99/472 X |
| 5,405,038 A | * | 4/1995 | Chuang | 220/231 |
| 5,449,079 A | * | 9/1995 | Yang | 141/65 |
| 5,535,900 A | * | 7/1996 | Huang | 99/472 X |
| 5,558,243 A | * | 9/1996 | Chu | 220/240 X |
| 5,611,376 A | * | 3/1997 | Chuang | 220/231 |
| 5,651,470 A | * | 7/1997 | Wu | 99/454 X |
| 5,806,575 A | * | 9/1998 | Tsay | 99/472 X |
| 5,916,470 A | * | 6/1999 | Besser et al. | 219/730 |
| 5,974,686 A | | 11/1999 | Nomura et al. | |
| 6,035,769 A | | 3/2000 | Nomura et al. | |

* cited by examiner

Primary Examiner—Timothy F. Simone
(74) Attorney, Agent, or Firm—Roth & Goldman, P.A.

(57) ABSTRACT

Disclosed is a vacuum valve including a lid, a depression defined on the lid, a boss formed on the lid at a bottom of the depression, a rotary cover rotatably arranged in the depression, and a closure member detachably coupled to the rotary cover. The vacuum valve comprises a through-hole defined at a center portion of the closure member; a vacuum maintaining member accommodated in the closure member and having an airtightening flange part and a semi-spherical head part, the airtightening flange part being brought into close contact with a portion of the rotary cover, and the semi-spherical head part projecting upward from the airtightening flange part in a rounded manner such that, as the lid of a vacuum container is repeatedly pressed and released, air existing in a container body is discharged to the outside and vacuumization is effected in the vacuum container; and an exposure bar extending upward from the semi-spherical head part by a predetermined length such that the exposure bar can be moved upward and downward through the through-hole of the closure member depending upon a vacuumization degree to allow a user to confirm a vacuumized state of the vacuum container with the naked eye.

5 Claims, 4 Drawing Sheets

COMBINED VACUUM VALVE AND VACUUM INDICATOR

BACKGROUND OF THE INVENTION

1. Field of the Invention

The present invention relates to a vacuum valve for a vacuum container of the type in which vacuumization is accomplished by pressing a lid of the vacuum container using the palm of the hand, and more particularly, to a vacuum valve which is installed inward of a closure member provided to a lid, in such a way as to reliably vacuumize a vacuum container and, at the same time, is capable of serving as a vacuum indicator for allowing a user to easily confirm a vacuumized state of the vacuum container with the naked eye.

2. Description of the Related Art

A vacuum container has a container body and a lid. The lid is defined with an air hole. The vacuum container is provided with a vacuum valve. The vacuum valve controls opening and closing of the air hole and in this way, performs a function of removing air existing in the vacuum container to allow a food item stored in the vacuum container to be kept for an extended period of time while not being deteriorated in its freshness. Generally, vacuum containers are divided into a first type of using a vacuum pump and a second type in which vacuumization is accomplished by pressing a lid of a vacuum container using the palm of the hand (hereinafter, referred to as a "lid pressing type").

In the lid pressing type vacuum container, a boss is formed on the lid, and an air hole is defined through the boss. The vacuum valve has a valving element to be brought into contact with an upper end surface of the boss and thereby control opening and closing of the air hole. The conventional vacuum valve has a drawback in that, since the boss and valving element has a narrow contact width, if the valving element is not precisely assembled or surface unevenness is caused in the valving element due to use over lengthy periods, it is difficult to reliably maintain the vacuum container under a vacuumized state. Further, because the conventional vacuum valve is positioned below a closure member and has the valving element which controls opening and closing of the air hole, it can only perform its original function and cannot serve as a vacuum indicator for allowing a user to easily confirm a vacuumized state of the vacuum container with the naked eye.

These days, in order to maintain a vacuumized state for an extended period of time, as shown in FIG. 7, an airtightening element 130 has been disclosed in the art. The airtightening element 130 is fitted around a boss which defines an air hole. Nevertheless, in this type of conventional vacuum valve, due to the fact that an upper end 130a of the airtightening element 130 possessing a hollow circular cylinder-shaped configuration has the same thickness as the other portions, if the airtightening element 130 is not precisely coupled to the boss, the upper end 130a of the airtightening element 130 cannot be flushed with an upper end of the boss. Therefore, the possibility of a gap to be created between a valving element and the airtightening element 130 is increased. For this reason, a problem is caused in that it is difficult to effectively and reliably maintain the inside of the vacuum container under a vacuumized state.

Also, in the case that a vacuum indicator is installed, separately from the vacuum valve, on a side of a container lid with an aim of allowing a user to confirm a vacuumized state of the vacuum container, as the number of component parts is increased and an assembling time is lengthened, a manufacturing cost is increased. In particular, since the vacuum valve and the vacuum indicator are positioned separately from each other, it is bothersome to confirm a vacuumized state of the vacuum container. Due to this fact, after a food item is received in a container body, the vacuum container is unlikely to be vacuumized.

SUMMARY OF THE INVENTION

Accordingly, the present invention has been made in an effort to solve the problems occurring in the related art, and an object of the present invention is to provide a combined vacuum valve and vacuum indicator which can effectively and reliably maintain the inside of a vacuum container under a vacuumized state for an extended period of time, and at the same time, employing a simple structure, allows a user to easily confirm the vacuumized state of the vacuum container with the naked eye.

In order to achieve the above object, according to one aspect of the present invention, there is provided a vacuum valve including a lid for closing a container body which is opened at an upper end thereof to receive a food item, a depression defined on the lid, a boss formed on the lid at a bottom of the depression and defined with an air hole for communicating the outside and the inside of the container body, a rotary cover rotatably arranged in the depression and having an accommodating space, and a closure member detachably coupled to the rotary cover in such a way as to close the accommodating space, the vacuum valve comprising: a through-hole defined at a center portion of the closure member; a vacuum maintaining member accommodated in the accommodating space and having an airtightening flange part and a semi-spherical head part, the airtightening flange part being brought into close contact with a portion of the rotary cover which defines the bottom of the accommodating space, and the semi-spherical head part projecting upward from the airtightening flange part in a rounded manner such that, as the lid of the vacuum container is repeatedly pressed and released, air existing in the container body is discharged to the outside and vacuumization is effected in the vacuum container; and an exposure bar extending upward from the semi-spherical head part by a predetermined length such that the exposure bar can be moved upward and downward through the through-hole of the closure member depending upon a vacuumization degree to allow a user to confirm a vacuumized state of the vacuum container with the naked eye.

According to another aspect of the present invention, there is provided a vacuum valve including a lid for closing a container body which is opened at an upper end thereof to receive a food item, a depression defined on the lid, a boss formed on the lid at a bottom of the depression and defined with an air hole for communicating the outside and the inside of the container body, a rotary cover rotatably arranged in the depression and having an accommodating space, and a closure member detachably coupled to the rotary cover in such a way as to close the accommodating space, the vacuum valve comprising: a through-hole defined at a center portion of the closure member; and a vacuum maintaining member accommodated in the accommodating space and having an airtightening flange part and a head part, the airtightening flange part being brought into close contact with a portion of the rotary cover which defines the bottom of the accommodating space and having an inner diameter greater than a diameter of the boss, the head part having a lower half and an upper half which are connected integrally with each other along a folding line, the lower half connected to a radial inner end of the airtightening flange part and having substantially a truncated and inverted cone-shaped configuration, and the upper half having a cone-shaped configuration so that a vertex of the upper half can be moved upward and downward through the through-hole of the closure member depending upon a vacuumization degree to allow a user to confirm a vacuumized state of the vacuum container with the naked eye.

According to a further aspect of the present invention, there is provided a vacuum valve including a lid for closing a container body which is opened at an upper end thereof to receive a food item, a depression defined on the lid, a boss formed on the lid at a bottom of the depression and defined with an air hole for communicating the outside and the inside of the container body, a rotary cover rotatably arranged in the depression and having an accommodating space, and a closure member detachably coupled to the rotary cover in such a way as to close the accommodating space, the vacuum valve comprising: a through-hole defined at a center portion of the closure member; an airtightening element having a hollow body part fitted around the boss and a lip part extending in a radial direction at least partially from the hollow body part; a vacuum maintaining member accommodated in the accommodating space and having an airtightening flange part and a semi-spherical head part, the airtightening flange part being formed to be brought into contact with the lip part of the airtightening element, and the semi-spherical head part projecting upward from the airtightening flange part in a rounded manner such that, as the lid of the vacuum container is repeatedly pressed and released, air existing in the container body is discharged to the outside and vacuumization is effected in the vacuum container; and an exposure bar extending upward from the semi-spherical head part by a predetermined length such that the exposure bar can be moved upward and downward through the through-hole of the closure member depending upon a vacuumization degree to allow a user to confirm a vacuumized state of the vacuum container with the naked eye.

According to still another aspect of the present invention, in an operating position of the vacuum valve in which the container body is vacuumized, the airtightening flange part of the vacuum maintaining member is brought into airtight contact with the airtightening element and the exposure bar is moved downward; and in a non-operating position of the vacuum valve in which the container body is not vacuumized, the airtightening flange part of the vacuum maintaining member is separated from the airtightening element and the exposure bar is moved upward.

According to yet still another aspect of the present invention, the body part of the airtightening element is formed at least partially to have a tubular configuration.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
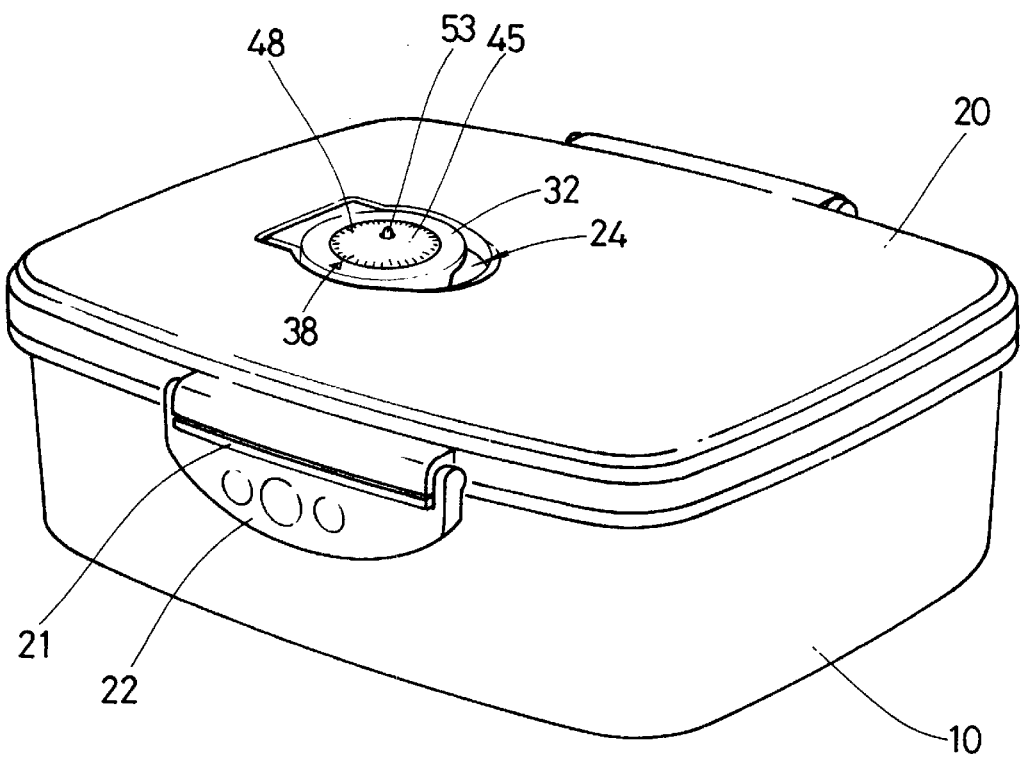
FIG. 1 is a perspective view illustrating a vacuum container on which a vacuum valve in accordance with a first embodiment of the present invention is installed.

Reference will now be made in greater detail to a preferred embodiment of the invention, an example of which is illustrated in the accompanying drawings. Wherever possible, the same reference numerals will be used throughout the drawings and the description to refer to the same or like parts.

In the present invention, a vacuum container has a container body 10 which is opened at an upper end thereof to receive a food item, and a lid 20 which closes the upper end of the container body 10. Each of vacuum containers in accordance with first through third embodiments of the present invention is installed on the lid 20.

In the container body 10, there can be received various food items such as meat, vegetables, and so on, which can be stored under a vacuumized state for an extended period of time while not being deteriorated in their freshness. In this regard, it is to be readily understood that, in addition to the configuration shown in FIG. 1, the container body 10 may have a variety of configurations such as a hollow square column, a hollow circular cylinder, a hollow trihedron, and so on, depending upon a kind of a food item.

Both front and rear sides of the container body 10 are formed with a pair of first locking segments 21, and both front and rear sides of the container lid 20 are formed with a pair of second locking segments 22. Due to this fact, after a food item is received in the container body 10, by engaging the first locking segments 21 into the second locking elements 22 and rotating the second locking segments 22 by a preset angle, the container body 10 can be closed by the lid 20.

At this time, it is not necessary for the container lid 20 to be locked to and unlocked from the container body 10 in obedience to the scheme shown in FIG. 1. Instead, it can be envisaged that a hinge (not shown) is provided at one sides of the container body 10 and lid 20, and the container body 10 is opened and closed by rotating the lid 20 about the hinge with respect to the container body 10.

Figure 2:
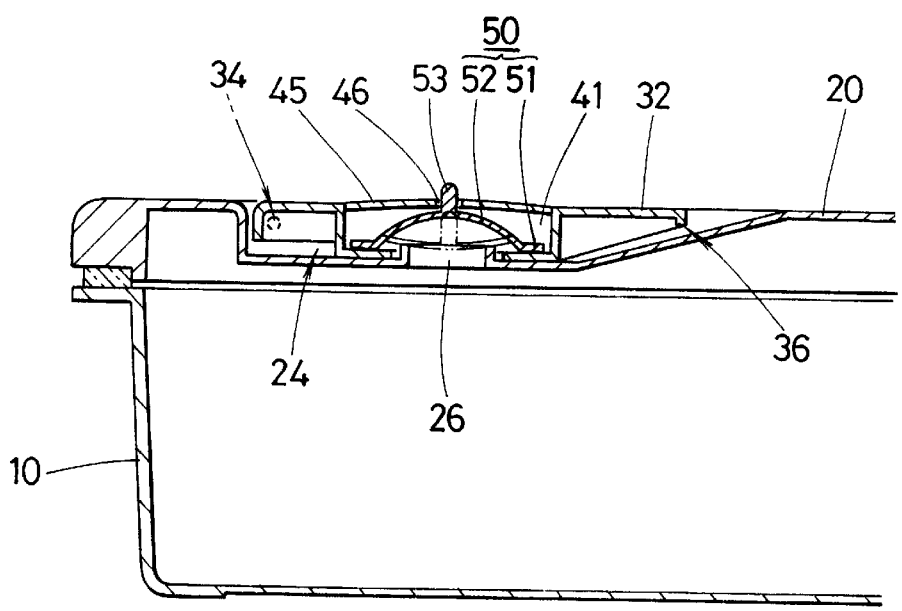
FIG. 2 is a partial enlarged sectional view illustrating a main part of FIG. 1.

FIG. 2 is a partial enlarged sectional view illustrating a main part of FIG. 1. As can be readily seen from FIG. 2, a depression 24 of a predetermined depth is defined at substantially a center portion of container lid 20. A boss 25 is projectedly formed on the lid 20 at a bottom of the depression 24.

The boss 25 is defined with an air hole 26. The air hole 26 serves as an air path through which air existing in the container body 10 can be discharged to the outside and outside air can flow into the container body 10.

A rotary cover 32 is rotatably arranged in the depression 24. A hinge part 34 is provided between the rotary cover 32 and the depression 24 to allow the rotary cover 32 to be rotated with respect to a wall of the lid 20 which defines the depression 24. A grasping part 36 is formed on an end of the rotary cover 32 which is opposite to the hinge part 34. Therefore, in a state wherein the grasping part 36 is gripped, by rotating the rotary cover 32 about the hinge part 34 in one direction, the rotary cover 32 can be introduced into and removed out of the depression 24 so that the air hole 26 can be closed and opened, respectively.

At this time, the hinge part 34 comprises a hinge projection which is formed on one of the rotary cover 24 and the wall of the lid 20, defining the depression 24, and a pair of hinge grooves (not shown) defined in the other of them. Here, the hinge projection and hinge grooves are given with no reference numerals, and the hinge part is representatively designated by reference numeral 34.

The rotary cover 32 defines an accommodating space 41 in which vacuum maintaining members 50, 50a and 50b are accommodated as described later. A closure member 45 is detachably coupled to the rotary cover 32 in such a way as to close the accommodating space 41. A lower surface of the closure member 45 is opened, and a through-hole 46 is defined at a center portion of the closure member 45. Since these constructional components are commonly employed through the first through third embodiments, the same reference numerals will be used to refer to the same components.

The vacuum maintaining member 50 according to the first embodiment of the present invention is accommodated in the accommodating space 41 below the closure member 45 so that vacuum can be introduced into and removed from the inside of the container body 10. The vacuum maintaining member 50 has an airtightening flange part 51 and a semi-spherical head part 52. The airtightening flange part 51 has an inner diameter which is larger than a diameter of the boss 25 so that the airtightening flange part 51 is brought into close contact with an outer surface of the boss 25. An exposure bar 53 extends upward from a center portion of the semi-spherical head part 52 by a predetermined length such that the exposure bar 53 can be moved upward and downward through the through-hole 46 of the closure member 45 depending upon a vacuumization degree. It is preferred that the vacuum maintaining member 50 and the exposure bar 53 are made of soft silicon resin.

Describing operations of the vacuum maintaining member 50 according to the first embodiment of the present invention, in an operating position of the vacuum valve in which the lid 20 is pressed by the palm of the hand to vacuumize the inside of the container body 10, as the lid 20 is pressed toward the container body 10, a pressure governing the inside of the container body 10 is increased, and by this, air existing in the container body 10 is discharged to the outside through between the airtightening flange part 51 and a portion of the rotary cover 32 which defines the bottom of the accommodating space 41. At the same time with this, as the lid 20 is freed by withdrawing the hand, suction force is momentarily generated, and by this suction force, the airtightening flange part 51 of the vacuum maintaining member 50 is forced to be brought into contact with the portion of the rotary cover 32. At this time, since the exposure bar 53 is moved downward in the operating position, that is, a vacuumizing position and upward in non-operating position, that is, a non-vacuumizing position, a user can easily confirm a vacuumized state of the vacuum container with the naked eye.

Figure 3:
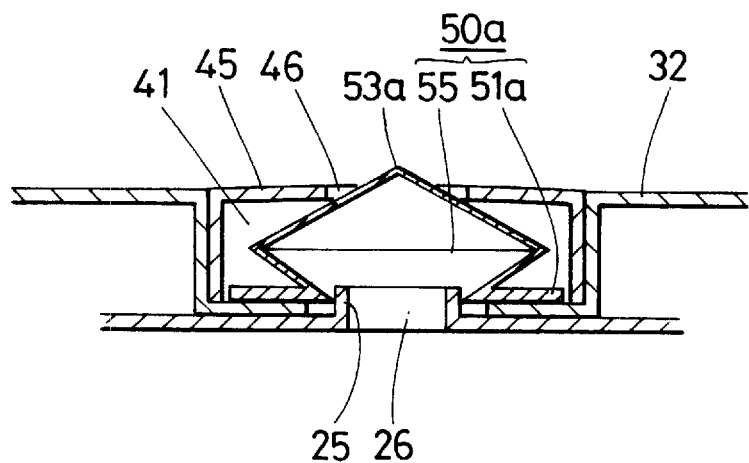
FIG. 3 is a sectional view illustrating a vacuum valve in accordance with a second embodiment of the present invention.

FIG. 3 is a sectional view illustrating a vacuum valve in accordance with a second embodiment of the present invention. As can be readily seen from FIG. 3, the vacuum maintaining member 50a according to this second embodiment of the present invention represents a variation of the vacuum maintaining member 50 according to the first embodiment of the present invention. The vacuum maintaining member 50a has an airtightening flange part 51a and a head part. The airtightening flange part 51a has an inner diameter which is slightly larger than a diameter of the boss 25 and is brought into close contact with a portion of the rotary cover 32 which defines the bottom of the accommodating space, around the boss 25 having defined therein the air hole 26.

The head part has a lower half and an upper half which are connected integrally with each other along a folding line 55. The lower half of the head part is connected to a radial inner end of the airtightening flange part 51a and has substantially a truncated and inverted cone-shaped configuration. The upper half of the head part has a cone-shaped configuration. Due to these constructional features of this second embodiment, a vertex of the upper half can be moved upward and downward through the through-hole 46 of the closure member 45 depending upon a vacuumization degree to allow a user to confirm a vacuumized state of the vacuum container with the naked eye. At this time, it is to be readily understood that a diameter of the through-hole 46 defined in the closure member 45 in this second embodiment must be greater than that in the first embodiment.

Figure 4:
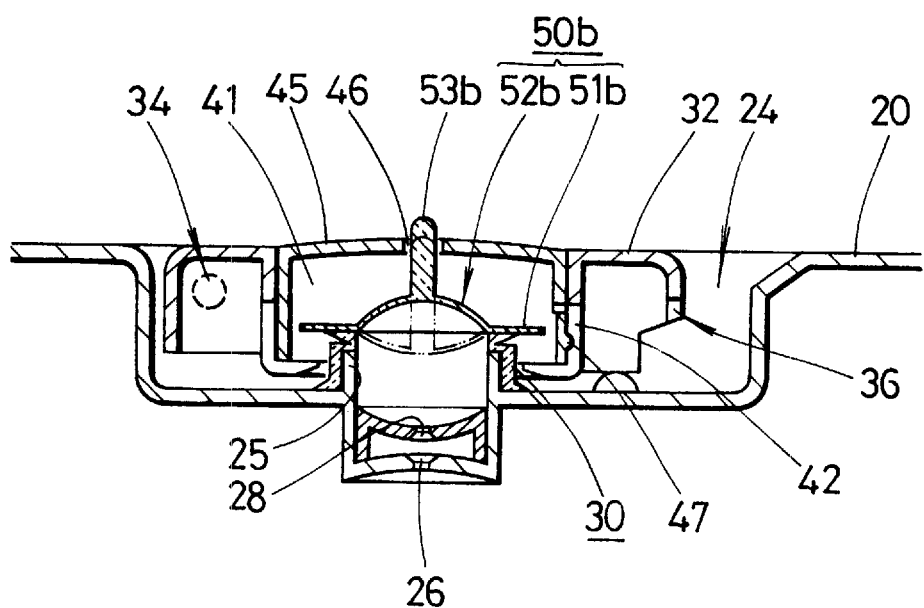
FIG. 4 is a sectional view illustrating a state wherein a vacuum valve in accordance with a third embodiment of the present invention is installed.
Figure 5:
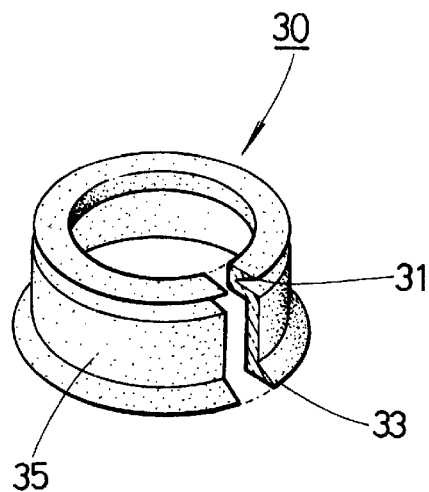
FIG. 5 is a partially broken-away perspective view illustrating an airtightening member used in the vacuum valve according to the third embodiment of the present invention.

FIG. 4 is a sectional view illustrating a state wherein a vacuum valve in accordance with a third embodiment of the present invention is installed. In the third embodiment, a hollow airtightening element 30 is fitted around the boss 25. In one example, a portion of the airtightening element 30 which may be made of soft silicon resin serving as an elastic element capable of shutting-off airflow is positioned on an upper end of the boss 25 to ensure that, when the rotary cover 32 is rotated toward the container body 10, the lip part cooperates with a vacuum maintaining member 50b to vacuumize the inside of the container body 10.

The airtightening element 30 has a hollow body part 35 and lip parts 31 and 33. The hollow body part 35 is fitted around the boss 25, and the lip parts extend radially outward from upper and lower ends of the body part 35, respectively. Hereafter, for the sake of clarity in explanation, the upper lip part will be referred to as a first lip part 31, and the lower lip part will be referred to as a second lip part 33. When the body part 35 of the airtightening element 30 is fitted around the boss 25, the first lip part 31 is positioned slightly higher than the upper end of the boss 25.

Below the closure member 45, there is placed the vacuum maintaining member 50b along with the airtightening element 30. Of course, the vacuum maintaining member 50b functions to vacuumizing and vacuum-releasing the inside of the container body 10. The vacuum maintaining member 50b has an airtightening flange part 51b and a semi-spherical head part 52b. An exposure bar 53b is formed at a center portion of the head part 52b. The exposure bar 53b extends upward from the semi-spherical head part 52b by a predetermined length such that the exposure bar 53b can be moved upward and downward through the through-hole 46 of the closure member 45 depending upon a vacuumization degree. At this time, while the exposure bar 53b may be made of the conventional plastic material, it is preferred that the exposure bar 53b and the head part 52b be made of soft silicon resin as soft material.

In the vacuum maintaining member 50b, in the operating position in which the inside of the container body 10 is vacuumized, the airtightening flange part 51b is brought into airtight contact with the first lip part 31 of the airtightening member 30, and in the non-operating position in which the inside of the container body 10 is vacuum-released, the airtightening flange part 51b is brought out of airtight contact with the first lip part 31 of the airtightening member 30. At this time, since the exposure bar 53 is moved downward in the operating position, that is, a vacuumizing position and upward in non-operating position, that is, a vacuum-releasing position, a user can easily confirm a vacuumized state of the vacuum container with the naked eye.

Meanwhile, below the boss 25, there is disposed a sound generating part 28. In the case that air flows through the air hole 26 into or out of the container body 10, the sound generating part 28 functions to generate an audible sound to allow the user to confirm whether or not the inside of the container body 10 is vacuumized. The sound generating part 28 is constructed in the same manner as the conventional art.

Adjacent to a lower end of a side wall of the rotary cover 32 which defines the accommodating space 41, a plurality of slots 42 are defined in a manner such that they are spaced apart one from another in a circumferential direction. A plurality of engagement levers 47 are formed at a lower end of the closure member 45 in a manner such that they can be engaged into the plurality of slots 42 when the closure member 45 is rotated. The engagement levers 47 can be formed by partially cutting out the lower end of the closure member 45.

Due to the presence of the slots 42 and the engagement levers 47, the closure member 45 can be rotated within the accommodating space 41 in a stepwise manner. Date patterns 48 are formed on an upper surface of the closure member 45 so that dates are circumferentially arranged thereon, and an indicator pattern 38 is formed on an upper surface of the rotary cover 32. As a consequence, by rotating the closure member 45 within the accommodating space 41 in the stepwise manner so that a desired date pattern 48 is aligned with the indicator pattern 38, it is possible to check an initial vacuumization date of a food item or the remaining effective vacuumization periods, as occasion demands.

Describing operation of the third embodiment of the present invention, in a state wherein the lid 20 is separated from the container body 10, a food item is received in the container body 10. Then, after placing the lid 20 to close the upper end of the container body 10, by rotating the second locking segments 22 by a preset angle, the lid 10 is locked to the container body 10.

Thereafter, with the grasping part 36 gripped, by rotating the rotary cover 32 about the hinge part 34, the rotary cover 32 is introduced into the depression 24. In a state wherein the rotary cover 32 is fully introduced into the depression 24, the airtightening flange part 51b of the vacuum maintaining member 50b is brought into airtight contact with the first lip part 31 of the airtightening element 30.

In this state, the lid 20 is pressed downward toward the container body 10. By doing this, air existing in the container body 10 is discharged to the outside through the air hole 26 defined in the boss 25. At this time, air passing through the air hole 26 generates audible sound due to the presence of the sound generating part 28.

In the course of discharging air existing in the container body 10 to the outside by pressing the lid 20 downward, the airtightening flange part 51b of the vacuum maintaining member 50b is brought into airtight contact with the first lip part 31 of the airtightening element 30. That is to say, the first lip part 31 having a lip-shaped configuration is airtightly squeezed against the body part 35 to be fully brought into surface contact with the airtightening flange part 51b of the vacuum maintaining member 50b. Accordingly, differently from the conventional art, it is possible to prevent a gap from being created between the vacuum maintaining member 50b and the airtightening element 30, whereby the inside of the container body 10 can be reliably maintained at a vacuumized state.

At this time, the vacuum maintaining member 50b squeezed against the first lip part 31 by pressing the lid 20 downward is moved downward to some extent along with the first lip part 31 to press the inside of the vacuum container 10. Hence, the exposure bar 53b formed on the head part 52b of the vacuum maintaining member 50b is moved downward into the closure member 45 through the through-hole 46. By this fact, from the downwardly moved exposure bar 53b, the user can easily confirm a vacuumized state of the vacuum container 10 with the naked eye.

As the inside of the container body 10 is vacuumized by pressing the container lid 20, it is possible to maintain freshness and an original state of a food item received in the container body 10 for an extended period of time.

In the case of using the food item received in the container body 10, with the grasping part 36 gripped, by rotating the rotary cover 32 about the hinge part 34 in the other direction, the depression 24 is held opened.

Thereupon, the airtightening flange part 51b of the vacuum maintaining member 50b is separated from the first lip part 31 and at the same time, the outside air flows into the container body 10 through the air hole 26 and the sound generating part 28 to vacuum-release the inside of the container body 10. Also, at this time, audible sound is generated in the sound generating part 28, and the exposure bar 53b formed on the head part 52b of the vacuum maintaining part 50b is moved upward toward an initial position. In this way, vacuum governing the inside of the container body 10 is released.

Thereafter, by rotating the second locking segment 22 in the reverse direction, the second locking segment 22 is unlocked from the first locking segment 20. In this state, by removing the container lid 20 from the container body 10, it is possible to use the food item received in the container body 10.

As described above, in the present invention by modifying structures of the vacuum maintaining members 50, 50a and 50b and the airtightening element 30, it is possible to effectively and reliably vacuumize the inside of the container body 10.

Moreover, in the present invention, by the provision of the exposure bars 53 and 53a which are moved downward and upward in response to vacuumization and vacuum-release, it is possible to easily confirm a vacuumized state of the container body 10 with the naked eye.

In addition to the airtightening element 30 as described in connection with the third embodiment, variously configured airtightening elements 30a through 30e as shown in FIGS. 6a through 6e can be adopted.

Figure 6A:
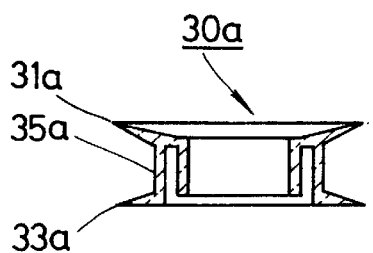
FIGS. 6a through 6e are sectional views illustrating variations of the airtightening member shown in FIG. 5.

The airtightening element 30a shown in FIG. 6a has a body part which is formed as a double-walled tubular structure, and both of first and second lip parts 31a and 33a extend radially outward. In the airtightening element 30b shown in FIG. 6b, a first lip part 31b extends radially inward and a second lip part 33b extends radially outward.

Figure 6B:
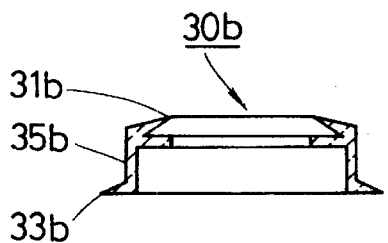
Figure 6C:
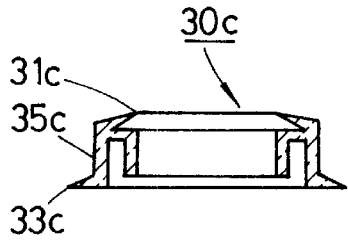
Figure 6D:
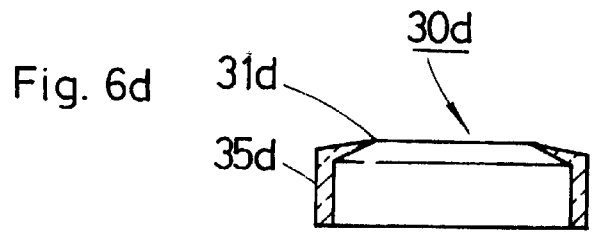
Figure 6E:
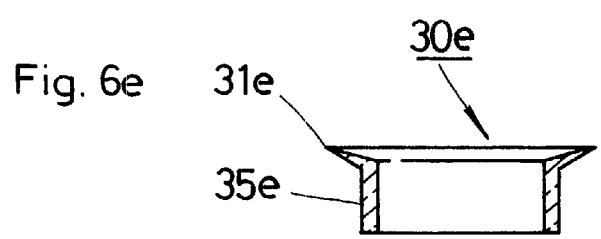
Figure 7:
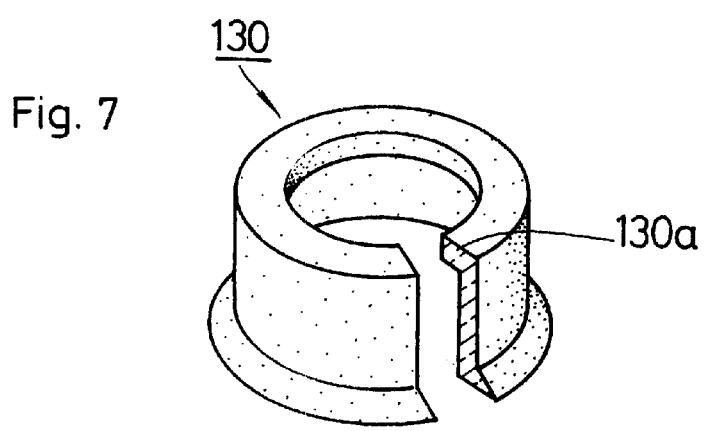
FIG. 7 is a partially broken-away perspective view illustrating an airtightening member installed on the conventional vacuum container.

The airtightening element 30c shown in FIG. 6c can be obtained by modifying the body part 35c of the airtightening member shown in FIG. 6b to have a double-walled tubular structure. In the airtightening element 30d shown in FIG. 6d, a first lip part 31d extends radially inward and a second lip part is not formed. Also, in the airtightening member 30e shown in FIG. 6e, a second lip part is not formed, and a first lip part 31e extends radially outward.

It is to be noted that, even when these various airtightening elements 30a through 30e are used, the same working effects are attained by the present invention.

As apparent from the above description, the combined vacuum valve and vacuum indicator according to the present invention, constructed as mentioned above, provides advantages in that, since it is possible to reliably control inflow and outflow into and out of a vacuum container, the inside of the vacuum container can be maintained under a vacuumized state for an extended period of time. Also, by employing a simple structure, it is possible to allow a user to easily confirm the vacuumized state of the vacuum container with the naked eye.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A vacuum valve including a lid for closing a container body which is opened at an upper end thereof to receive a food item, a depression defined on the lid, a boss formed on the lid at a bottom of the depression and defined with an air hole for communicating the outside and the inside of the container body, a rotary cover rotatably arranged in the depression and having an accommodating space, and a closure member detachably coupled to the rotary cover in such a way as to close the accommodating space, the vacuum valve comprising:

a through-hole defined at a center portion of the closure member;

a vacuum maintaining member accommodated in the accommodating space and having an airtightening flange part and a semi-spherical head part, the airtightening flange part being brought into close contact with a portion of the rotary cover which defines the bottom of the accommodating space, and the semi-spherical head part projecting upward from the airtightening flange part in a rounded manner such that, as the lid of the vacuum container is repeatedly pressed and released, air existing in the container body is discharged to the outside and vacuumization is effected in the vacuum container; and an exposure bar extending upward from the semi-spherical head part by a predetermined length such that the exposure bar can be moved upward and downward through the through-hole of the closure member depending upon a vacuumization degree to allow a user to confirm a vacuumized state of the vacuum container with the naked eye.

2. A vacuum valve including a lid for closing a container body which is opened at an upper end thereof to receive a food item, a depression defined on the lid, a boss formed on the lid at a bottom of the depression and defined with an air hole for communicating the outside and the inside of the container body, a rotary cover rotatably arranged in the depression and having an accommodating space, and a closure member detachably coupled to the rotary cover in such a way as to close the accommodating space, the vacuum valve comprising:

a through-hole defined at a center portion of the closure member; and a vacuum maintaining member accommodated in the accommodating space and having an airtightening flange part and a head part, the airtightening flange part being brought into close contact with a portion of the rotary cover which defines the bottom of the accommodating space and having an inner diameter greater than a diameter of the boss, the head part having a lower half and an upper half which are connected integrally with each other along a folding line, the lower half connected to a radial inner end of the airtightening flange part and having substantially a truncated and inverted cone-shaped configuration, and the upper half having a cone-shaped configuration so that a vertex of the upper half can be moved upward and downward through the through-hole of the closure member depending upon a vacuumization degree to allow a user to confirm a vacuumized state of the vacuum container with the naked eye.

3. A vacuum valve including a lid for closing a container body which is opened at an upper end thereof to receive a food item, a depression defined on the lid, a boss formed on the lid at a bottom of the depression and defined with an air hole for communicating the outside and the inside of the container body, a rotary cover rotatably arranged in the depression and having an accommodating space, and a closure member detachably coupled to the rotary cover in such a way as to close the accommodating space, the vacuum valve comprising:

a through-hole defined at a center portion of the closure member;

an airtightening element having a hollow body part fitted around the boss and a lip part extending in a radial direction at least partially from the hollow body part;

a vacuum maintaining member accommodated in the accommodating space and having an airtightening flange part and a semi-spherical head part, the airtightening flange part being formed to be brought into contact with the lip part of the airtightening element, and the semi-spherical head part projecting upward from the airtightening flange part in a rounded manner such that, as the lid of the vacuum container is repeatedly pressed and released, air existing in the container body is discharged to the outside and vacuumization is effected in the vacuum container; and an exposure bar extending upward from the semi-spherical head part by a predetermined length such that the exposure bar can be moved upward and downward through the through-hole of the closure member depending upon a vacuumization degree to allow a user to confirm a vacuumized state of the vacuum container with the naked eye.

4. The vacuum valve as set forth in claim 3, wherein, in an operating position of the vacuum valve in which the container body is vacuumized, the airtightening flange part of the vacuum maintaining member is brought into airtight contact with the airtightening element and the exposure bar is moved downward; and in a non-operating position of the vacuum valve in which the container body is not vacuumized, the airtightening flange part of the vacuum maintaining member is separated from the airtightening element and the exposure bar is moved upward.

5. The vacuum valve as set forth in claim 3, wherein the body part of the airtightening element is formed at least partially to have a tubular configuration.

* * * * *